United States Patent

Metts

[11] 3,832,854
[45] Sept. 3, 1974

[54] BOTTOM FLOW POND LEVEL CONTROL SYSTEM

[76] Inventor: James E. Metts, 931 Bonnie Ln., Aiken, S.C. 29801

[22] Filed: July 24, 1973

[21] Appl. No.: 382,149

[52] U.S. Cl.............................. 61/1, 61/17, 61/18, 137/577
[51] Int. Cl............................................. E02b 3/00
[58] Field of Search............ 61/1, 2, 10, 18, 17, 12; 137/236, 577, 578, 577.5

[56] References Cited
UNITED STATES PATENTS

| | | | |
|---|---|---|---|
| 2,961,098 | 11/1960 | Nash | 137/577 X |
| 3,555,829 | 1/1971 | Trewhella | 61/17 |
| 3,701,260 | 10/1972 | Soileau | 61/12 |

Primary Examiner—Robert R. Mackey
Assistant Examiner—Philip C. Kannan
Attorney, Agent, or Firm—Townsend M. Belser, Jr.

[57] ABSTRACT

The system disclosed controls the level of an open body of water and includes a tank suitably supported in the body of water adjacent to the water surface, the tank being provided with an inlet and an outlet, a conduit connected to the tank inlet for conducting water from the bottom of the body of water into the interior of the tank, and a conduit connected to the tank outlet for discharging water from the tank interior to a remote location when the water level in the tank interior reaches a level corresponding to a predetermined level in the open body of water.

10 Claims, 6 Drawing Figures

PATENTED SEP 3 1974					3,832,854
SHEET 1 OF 2
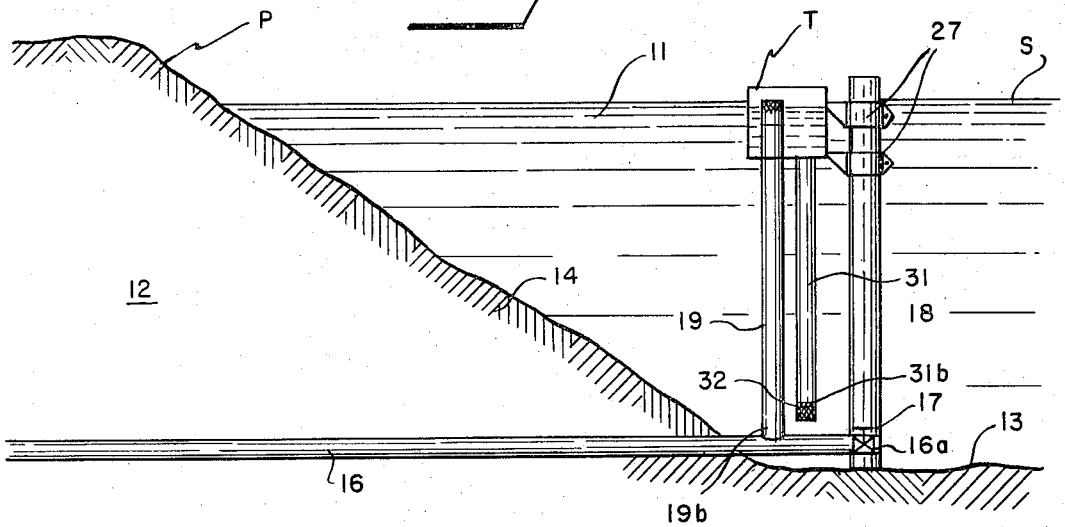
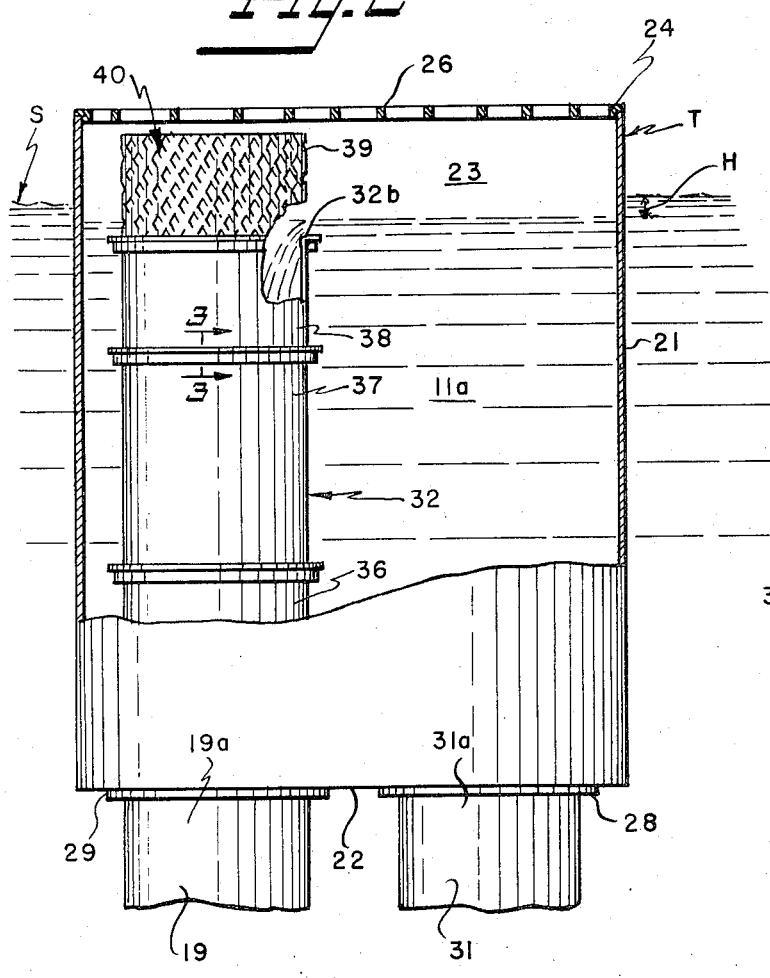
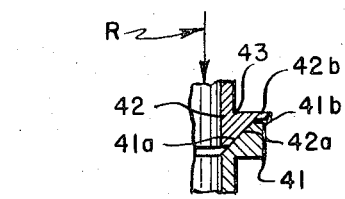
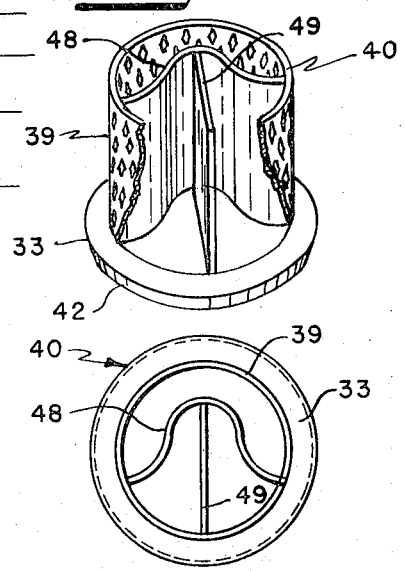

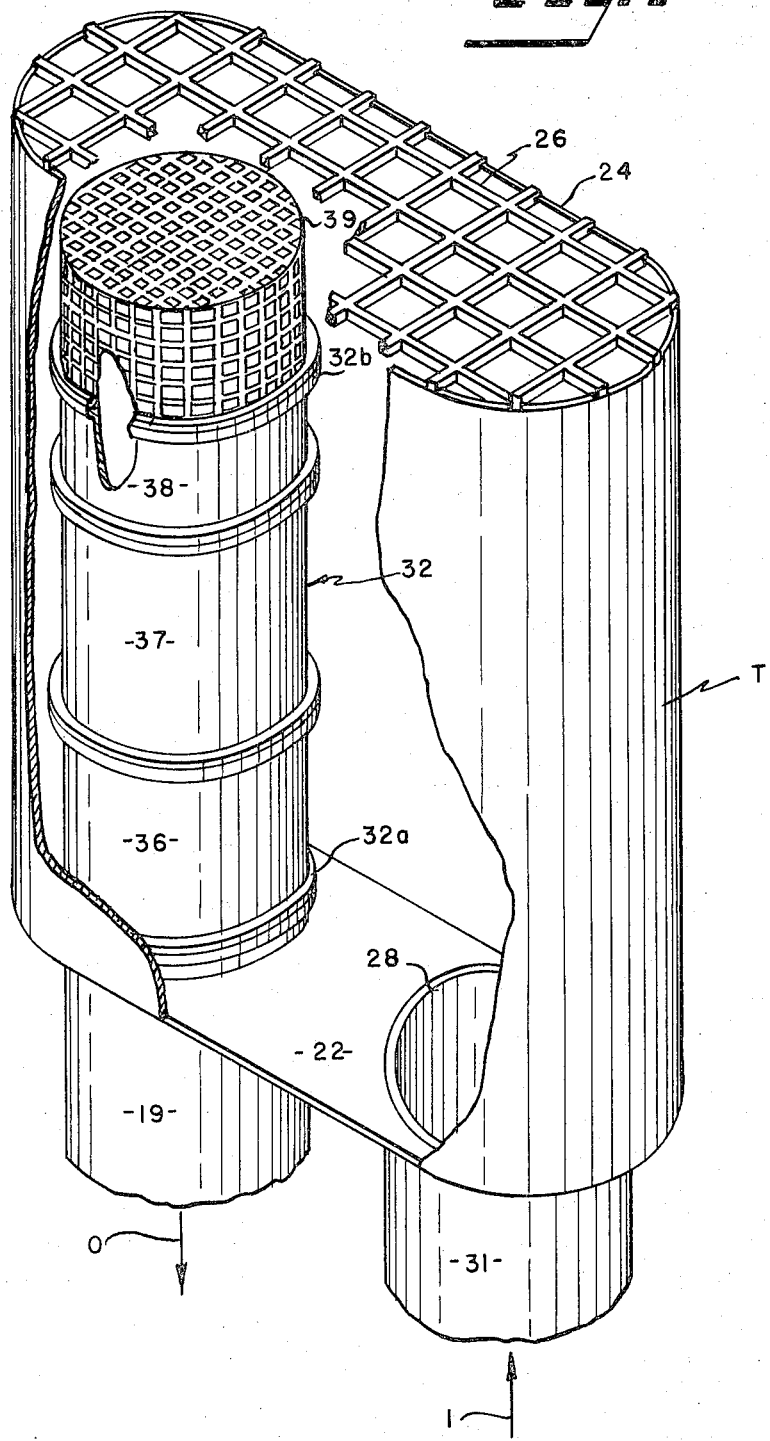

BOTTOM FLOW POND LEVEL CONTROL SYSTEM

BACKGROUND OF INVENTION

This invention relates to water level control and more particularly to an ecologically oriented system for controlling the water level in an open body of water, such as a pond or lake, while enhancing the basic life sustaining natural elements found therein.

It is generally desirable that bodies of water, such as ponds, lakes and reservoirs, into which there is a positive flow of water be provided with a suitable arrangement for maintaining the water at a predetermined level or depth. The flow of water into such bodies is generally irregular, ranging from a relatively normal influent flow to flood conditions during which there is an unusually heavy flow of water into the pond. In addition, in ponds, lakes or the like, there arises occasionally the need for lowering the water level a few feet for weed control, dock repair or landscaping. Also, in those types of water basins where feed for wildlife is planted, the common practice is to lower the water level for planting and, upon growth of the plants to maturity, to raise the basin to a higher water level in order to cover the mature plants.

Another consideration in bodies of water, such as fish production ponds and the like, is the desirability of draining the water from the pond by removing water from the bottom of the pond rather than from the top to preserve the life sustaining quality of the top water from which to harvest the fish.

The common practice today for maintaining water depth is "top-water" level control through the use of an upstanding drain pipe or riser in the pond. Water from the surface of the pond flows into the open upper end of the drain pipe as the water level in the pond rises above a selected level determined by the height of the pipe relative to the pond bottom. Although it has been proposed in the past to maintain the water level by draining excess water from the bottom of the pond, such bottom water drainage systems have proven complicated and expensive, utilizing valves and the like which had to be submerged at a fixed depth and were difficult to adjust and maintain. The desirability of removing excess water from the bottom of the pond rather than from the top has long been recognized for many reasons. For instance, water near the bottom of a pond contains less dissolved oxygen than water adjacent to the surface where oxygen is added to the water by surface absorption and photosynthesis. Furthermore, removal of bottom water helps warm the pond water earlier in the spring and later in the fall, thereby promoting a longer fish growing season. In addition, the effectiveness of fertilizer in promoting the growth of microscopic plants in the water is increased, with attendant lower fertilizer costs, by bottom water removal. Of even greater significance in the use of bottom water overflow is the elimination of toxic chemical compounds such as hydrogen sulfide, carbon dioxide, ammonia and other pollutants, as well as silt and other debris, which normally accumulate and settle within the water layers adjacent to and on the bottom of such bodies of water.

SUMMARY OF INVENTION

In view of the foregoing background and prior art, a primary object of the present invention is to provide a water level control system for an open body of water which discharges excess water to a remote location by new and novel means that enhance the life sustaining natural elements within the body of water as a whole.

Another object of this invention is to provide a new and novel water level control system for a relatively large open body of water wherein a predetermined water level is maintained by the continuous removal of the excess water from the bottom of the body of water.

A further object of this invention is to provide a new and novel water level control system for an open body of water which is easily adjustable to maintain the water at a selected level throughout a wide range of predetermined depths.

Still another object of the present invention is to provide a new and novel water level control system for a body of water which is simple and inexpensive to construct, is of a rugged and durable design requiring a minimum of maintenance, is readily adaptable to previously installed drainage systems, and may be easily and readily serviced.

This invention further contemplates the provision of a new and novel water level control system for an open body of water, such as a pond or lake, which provides for the continuous removal of contaminants, pollutants, and silt from the body of water and which blocks the flow of foreign matter such as fish or the like from the body of water.

Another object of the invention is to provide a water drainage device which prevents malfunction and damage to the system from turbulence in outflowing water and from high pressure differentials on components of the system.

A still further object of this invention is to provide a water level control system for a body of water which provides water level control under both normal and abnormal influent conditions.

The exact nature of the invention as well as other objects and advantages of the invention will become apparent from the following description and the annexed drawings.

The objects stated above and other related objects and advantages of this invention are accomplished by the provision of a tank having a side wall and a bottom wall defining a water tight interior which is supported by suitable means within the body of water adjacent to the air-water interface of its surface. The tank is provided with an inlet and an outlet in the bottom wall and an open upper end disposed above the water surface at a predetermined flood level. A first conduit means is connected to the tank inlet for conducting water from the bottom of the body of water into the interior of the tank and a second conduit means is connected to the tank outlet for conducting water from the tank interior to a remote location at a predetermined exterior water level below said flood level to thereby maintain the body of water at said predetermined exterior level during normal influent flows.

DESCRIPTION OF DRAWINGS

The novel features which are believed to be characteristic of the invention are set forth with particularity in the appended claims. The invention itself, however, both as to its organization and method of operation may be best understood by reference to the following description taken in conjunction with the accompanying drawings in which:

FIG. 1 is a side elevational view of an open body of water with the water level control system of the invention installed near the dam which formed the body of water;

FIG. 2 is an enlarged fragmentary sectional view of the tank portion of the invention shown in FIG. 1;

FIG. 3 is an enlarged fragmentary section taken along line 3—3 of FIG. 2 showing construction details of the invention;

FIG. 4 is a perspective view partially broken away of the tank portion of the invention shown in FIG. 2;

FIG. 5 is an enlarged perspective view of the strainer portion of the invention shown in FIG. 2 illustrating internal construction details; and FIG. 6 is a plan view of that portion of the invention shown in FIG. 5.

DETAILED DESCRIPTION OF PREFERRED EMBODIMENT

Referring now to the drawings and to FIG. 1 in particular, there is shown one embodiment of the invention installed in operating position in an open body of water 11 forming a pond or lake, designated generally by the letter P. As can be understood, the pond P is created by an earthen dam 12, and includes a bottom 13 and dam sides 14 over which water usually flows in a somewhat continuous manner to form the body of water 11 having an upper surface designated generally by the letter S.

Many such ponds are provided with facilities for completely draining the pond such as a conduit or pipe 16 having a manually operated valve 17 disposed in the pipe 16 adjacent to one end 16a. The valve is opened for draining water from the pond adjacent the pond bottom 13. For instance, in fish production ponds utilized for the growth and harvesting of fish, such drain facilities are commonly used when the fish are to be removed for shipment live to the marketplace. Preferably, such drain facilities include supporting means such as an upstanding post 18 and an outflow conduit or riser 19 communicating at its lower end with a drain conduit 16 having a conventional bottom drain valve 17. The riser 19 may also be of conventional design as the invention is adapted to be utilized with previously installed riser and bottom drain valve facilities. However, the invention as described hereinafter is for installation in a pond P where no such preexisting facilities are available.

As specifically illustrative of the invention, the water level control system comprises a water tight drum or tank, designated generally by the letter T, which is preferably of circular cross-section and includes a continuous cylindrical side wall 21 and a planar bottom wall 22 which defines a water tight interior 23. The tank T is preferably provided with an open upper end 24 covered by a detachable grate 26 or the like for purposes explained hereinafter and as shown best in FIG. 4.

Means are provided for supporting the tank T in the body of water 11 adjacent to the water surface S such that the upper edge of the side wall 21 extends for a substantial distance above the normal range of water levels. More specifically, a post 18 may be utilized to support the tank T in its operative position as shown in FIG. 1, one or more brackets 27 being used to suitably mount to tank on the post 18. Preferably, the brackets 27 are clamped to the post 18 in an adjustable fashion so that the vertical height of the tank may be varied, the brackets being suitably secured at one end to the tank side wall 21 and at the other to the post for rigidly supporting the tank T in the body of water 11.

As previously indicated and best shown in FIG. 2, the tank T is positioned in the body of water 11 with its open end 24 above the air-water interface at the water surface S under normal water level conditions. Under abnormal influent or flood conditions in the body of water 11, exceeding the capacity of inlet conduit 31, the excess water flows over the upper edge of the tank open end 24 for direct discharge from the surface S through the conduit 32 and pipe 19, the grate 26 being provided for filtering foreign matter from this water.

Referring again to FIG. 2, the tank T is provided with an inlet aperture 28 and an outlet aperture 29, preferably disposed within the tank bottom wall 22. A first conduit means 31 is connected to the tank inlet 28 for conducting water from the bottom of the body of water 11 into the tank interior 23 at a predetermined level of the water surface S. More specifically, the conduit or pipe 31 is connected at its upper end 31a to the tank inlet 28 and extends downwardly from the tank T to produce a free standing open lower end 31b adjacent to the pond bottom 13. This arrangement permits the entrance of water from the pond bottom into the pipe 31 and, when the water level S corresponds to the level of the tank inlet 28, into the tank interior 23. Preferably, a filter 32 is provided at the pipe end 31b to prevent the entry of fish and large foreign matter which could clog the system.

The invention also includes second conduit means 19 connected to the tank outlet 29 for conducting water from the tank interior 23 (the water in the tank being designated by the number 11a) to a remote location for purposes of maintaining the body of water 11 at a predetermined level. Although, as indicated above, the conduit or pipe 19 may already be installed as part of a top water discharge system, a specially designed pipe 19 may be provided so as to be more readily connected at its upper end 19a to the tank outlet 29. The lower end 19b of pipe 19 is suitably arranged to remove water flowing downwardly in the direction of the arrow O (FIG. 4) to a remote location, either as an extension of conduit 19 or by connection to a bottom drain conduit 16 as shown in FIG. 1.

As the upper edges of the tank inlet 28 and outlet 29 are preferably at the same level near the tank bottom 22, the surface S of the body of water 11 may be maintained at substantially the same level by flow of water from the bottom of the pond P upward through pipe 31 in the direction of the arrow I into the tank interior 23 and downward through pipe 19 to the remote location, thus maintaining the surface S at a level determined by the upper edge of outlet 29 into which bottom water overflows. However, in the preferred embodiment, the second conduit means includes an upstanding conduit portion, designated generally by the number 32, disposed within the tank interior 23 over the outlet 29 as shown best in FIGS. 2 and 4 of the drawing.

The conduit 32 has its lower end 32a connected in sealed communication with the upper edge of tank outlet 29 as best shown in FIG. 4, as is provided with an open upper end 32b over the edge of which there is an overflow of water from the tank interior 23 into the pipe 19 through conduit portion 32. The surface S of the body of water 11 is thereby maintained at a level determined by the height of the upper conduit end 32b. The height of the conduit 32 is selected so as to maintain the body of water at the predetermined level desired for normal influent flow. In the preferred embodiment, means are also provided for adjusting the height of the conduit portion 32 to control the body of water 11 over a predetermined range of water levels. More specifically, the conduit 32 includes a plurality of tubular sections or weirs of varying lengths, three such sections, designated 36, 37 and 38, being utilized in the illustrated embodiment.

The tubular weirs are arranged to be detachable interconnected and vertically stacked in coaxial alignment to form the conduit 32 at a preselected height. By way of example, weirs 36 and 37 may each be 12 inches in length and weir 38 may be six inches in length. Thus, if the tank T is approximately 42 inches in height, the height of conduit 32 may be adjusted in 6 inch increments over a range of from 6 inches to 30 inches by interchanging the tubular weirs to attain the water level desired. The weir tube diameter, of course, depends on the rate of flow of normal influent to the body of water 11. For flows usually encountered in 3 to 10 acre ponds, weir diameters of twelve to twenty-four inches are appropriate.

The design of the tubular weirs also includes means which utilize the flow of water through the conduit 32 to create and maintain a seal between the sections. More specifically, and referring now to FIG. 3, a circumferentially extending, upwardly and outwardly projecting first flange 41 having an upwardly tapered inner portion 41a is provided on one end of each weir, and a circumferentially extending, downwardly and outwardly projecting second flange 42 having downwardly tapered outer portion 42a is provided on the other end of each weir.

When the weir sections are in their stacked interconnected connected condition, the inner tapered portion 41a on a lower section is arranged for underlying mating engagement with the overlying outer tapered portion 42a on an upper adjacent section. With this arrangement, the tapered portions 41a and 42a are held firmly in a sealing engagement by the downward flow of water through the conduit 32, which produces fluid friction forces on the inner wall of conduit 32 in the direction of the arrow R.

The first and second flanges 41 and 42 are also provided with peripheral edge portions 41b and 42b, respectively, which are disposed in spaced relation when the flanges 41 and 42 are in sealed engagement. As shown in FIG. 3, the spaced edge portions 41b and 42b form an annular gap 43 to permit the insertion of a flat tool, such as a screwdriver, for easy separation of the weir sections when a change in the height of the conduit 32 is to be made for purposes of adjusting the water level of the body of water 11.

It is also to be understood that the tank outlet 29 is provided with an annular tapered flange 29a equivalent to said first weir flange so as to similarly engage the second weir flange 42 when the lower weir section 36 is positioned in the tank outlet 29 as best shown in FIG. 4.

A detachable water straining section 40 may be provided on the upper end of conduit 32 for the purpose of filtering relatively large objects from the water flowing from the tank interior 23 into the open conduit end 32b. More specifically, a tubular screen 39 having an annular tapered flange 33 equivalent to the aforesaid second weir flange is arranged to be disposed within the open conduit end 32b by mating engagement with the tapered portion 41a of the first weir flange 41 on the uppermost weir section, the same being weir 38 in the illustrated embodiment. Thus, water flowing into the open conduit end 32b first flows through the screen 39, thereby preventing the entry of large foreign matter, such a fish, into the conduit 32.

In the preferred embodiment a baffling means is provided within the upper most section to eliminate vortex turbulence that would otherwise be created by the natural whirlpool effect of water flowing into an open ended circular conduit. Such tubulence can cause vibrations within the weir sections which tend to break the sealing engagement between adjacent weir flanges and can damage the tank outlet pipe connection. The baffling means is preferrably installed within the strainer section 40 as shown in FIGS. 5 and 6 and includes an arcuate bell-shaped partition 48 positioned within the screen 39 and extending throughout the axial length of the section in a symmetrical fashion. A second planar partition 49 is provided within the section interior and also extends throughout the axial length thereof from the inner surface of the apex of partition 48 to the section side wall as shown best in FIG. 6. A similar baffling means may also be provided within the top weir section 38 to further reduce vortex tubulence in the outlet conduit.

In the operation of the invention, the positioning of the various components is determined in accordance with the level of water to be maintained in the pond P as has been explained above. This includes the selection of the desired height for the tank T as well as the height of conduit 32 and the length of the individual weir sections. As the body of water rises and the influent continues, water is removed from the bottom of the pond through the intake pipe 31 and ultimately flows into the interior 23 of the tank T. As the level of the body of water continues to rise, there is then a corresponding rise in the level of the water 11a within the tank T until it reaches the open upper end 32b of the conduit 32. At this time, water from the tank interior 23 flows over the upper end of the conduit 32 through the screen 39, being baffled by the partitions 48 and 49, and through the conduit 32 into the discharge pipes 19 and 16 to a remote location. As the water flows into the top of conduit 32, a head of water, designated generally by the letter H in FIG. 2, increases the rate of flow into the conduit under gravity pressure. The diameter of conduit 32 and subsequent pipes is chosen to provide adequate flow rate capacity under normal pond influent flow conditions to keep the head H to a minimum and substantially equalize the pressure on opposite sides of the tank side wall 21 and thus maintain the surface S of the body of water 11 at the selected level.

While there has been described what at present is considered to be the preferred embodiment of the invention, it will be understood by those skilled in the art that various changes and modifications may be made therein without departing from the scope of invention. It is also possible, of course, to use various features of the specific embodiment described, either separately or in various combinations, and such uses are within the contemplation of the present invention.

The unique design features of the present invention are capable of providing continuous water outflow from the bottom of ponds, lakes, reservoirs, or other bodies of water of almost any size. By simply adding or removing the tubular weirs or sections through the top of the weir tank or drum, any increment of change in water level can be attained. The simplicity of the invention, which does not use any moving parts, enables it to be manufactured economically and installed at minimum cost and to provide years of maintenance free operation.

Many structural changes are possible and are intended to be within the scope of the disclosure. Thus, at greater water depths, especially those exceeding 15 feet, the dirt fill of the dam can be utilized to provide direct support for the tank T, with the discharge pipe 19 passing immediately downward through the dam fill and the inlet pipe 31 sloping upward from the bottom 13 along the inner dam face 14. If a bottom drain line, such as line 16, is provided, it can either be separate from or tied into the discharge pipe. Furthermore, the discharge pipe may be directed either horizontally or on a downward slope through the dam fill. Alternatively, either the discharge pipe or the inlet pipe, or both, may consist of stacked concrete culverts or of chimney type conduits of concrete block. Another contemplated variation envisions the use of concentric conduits to support the weir tank, the larger, outer conduit serving as the inflow pipe and the smaller, inner conduit serving as the outflow pipe to a remote location on the other side of the dam.

It is therefore to be understood that the foregoing drawings and specification merely illustrate and describe a preferred embodiment and that other embodiments are within the scope of the appended claims.

Having thus described and illustrated the invention, what is claimed is:

1. A water level control system for an open body of water continuously fed by sources of influent water flow comprising a tank having a side wall and a bottom wall defining a substantially water tight interior, said tank being provided with an inlet and an outlet and means for maintaining said interior at ambient atmospheric pressure; means for supporting said tank in the body of water adjacent to the surface of said body of water with the upper edge of the side wall a substantial distance above said surface under normal influent water flow; first conduit means connected to said tank inlet for conducting water from the bottom of said body of water into the interior of said tank at a predetermined level of water in said body of water; and second conduit means connected to said tank outlet for conducting water from the interior of said tank to a remote location to thereby maintain said body of water at a predetermined level by gravity flow through said conduits.

2. A water level control system in accordance with claim 1 wherein said ambient pressure means comprises an open upper tank end, said open tank end being arranged to permit overflow of water from the surface of said body of water into said tank interior for discharge through the tank outlet under excessive influent water flow.

3. A water level control system in accordance with claim 1 wherein said tank inlet and outlet are disposed within said tank bottom wall.

4. A water level control system in accordance with claim 1 wherein said tank outlet includes upstanding conduit means disposed within said tank interior and having an open upper end for the overflow of water from said tank interior at a water level within said tank determined by the height of said open end relative to said bottom wall, said interior water level corresponding to the desired level of the surface of said body of water under normal influent flow.

5. A water level control system in accordance with claim 4 wherein said upstanding conduit means includes means for adjusting the height of said open upper end to change the level at which the surface of the body of water is maintained under normal influent flow.

6. A water level control system in accordance with claim 4 wherein said upstanding conduit means comprises a plurality of tubular conduit sections of various lengths, said sections being arranged to be vertically stacked in coaxial alignment to form a conduit of selected height and detachably interconnected for adjusting the height of said open end by removal or insertion of one or more sections when the level of the surface of the body of water is to be changed.

7. A water level control system in accordance with claim 6 wherein said upstanding conduit means includes means for forming a seal between abutting conduit sections, said sealing means comprising a circumferentially extending, outwardly directed first flange having an inner tapered portion on one end of each of said tubular sections, a circumferentially extending, outwardly directed second flange having an outer tapered portion on the other end of each of said tubular sections, said inner tapered portion on the first flange of a lower section being arranged for underlying mating engagement with said outer tapered portion on the second flange of an abutting upper section when said sections are in their stacked relationship and said abutting flanges being movable into a tight fitting sealing engagement by the flow of water over the inner surfaces of said conduit.

8. A water level control system in accordance with claim 7 wherein said first and second flanges have peripheral edge portions disposed in spaced relationship when said sections are in mating engagement to form an annular gap for receiving a tool for separation of said sections.

9. A water level control system in accordance with claim 4 wherein said upstanding conduit means includes a water straining means detachably disposed over the open upper end of said conduit for separating foreign matter from the bottom water flowing through said tank interior, and wherein a grate is disposed within the upper open end of said tank for separating foreign matter from the surface water flowing into said tank interior upon excessive influent flow into said body of water.

10. A water level control system in accordance with claim 4 wherein said upstanding conduit means includes baffling means disposed within the open upper end of said conduit for reducing the turbulence of the water overflowing into said open conduit end.

* * * * *